Figure 1:
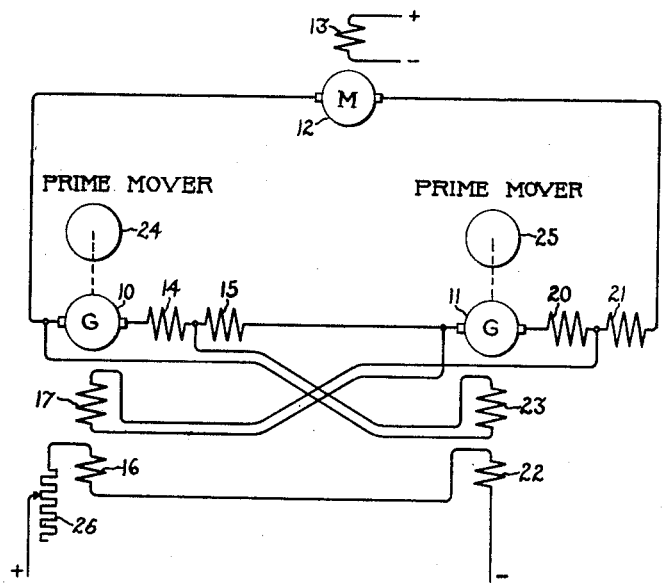

Sept. 5, 1933.  B. M. MILLS  1,925,876

VARIABLE VOLTAGE DRIVE

Filed June 30, 1932

Inventor:
Bruce M. Mills,
by *Chas. E. Tullar*
His Attorney.

Patented Sept. 5, 1933

1,925,876

UNITED STATES PATENT OFFICE 1,925,876

VARIABLE VOLTAGE DRIVE

Bruce M. Mills, Schenectady, N. Y., assignor to General Electric Company, a corporation of New York Application June 30, 1932. Serial No. 620,136

5 Claims. (Cl. 171—223)

My invention relates to the control of a variable voltage drive of the type having a plurality of generators connected in series to a load circuit and has for an object the provision of a simple and reliable means for stabilizing and maintaining substantially equal division of load between the machines.

While it is particularly applicable to variable voltage drives for excavating machinery, such as dredges and power shovels wherein the loads are often increased to approximately the stalling point of the driving motors, my invention may be applied to other applications of variable voltage drives.

Heretofore it has been customary, in addition to a separately excited and a compensating field winding, to provide for each generator a differential field winding to insure a drooping volt-ampere characteristic curve, and a self excited field winding to modify the shape of this curve in a manner to increase the maximum power output of the generator. By increasing the power output at certain torque loads, the motors are caused to respond more quickly to changes in load conditions, which response is desirable in the operation of excavating machinery and the like. However, when the torque load on the motor is increased it will be understood that the increased current in the differential series field winding of the generators will decrease the generator flux so that the separately excited field winding supplies a substantial portion of the net excitation. When the current flow becomes great enough, the differential field winding produces a magnetomotive force equal and opposite to all of the magnetomotive forces produced by the other field windings of the generator except as required to overcome IR drop in the circuit. Under these conditions a shift of the load from one generator to the other generator may be caused by the self excited field winding as affected by the difference in the voltage characteristics of the two generators. This difference may arise due to variations in engine speed, imperfections in engine governor action and unavoidable slight differences which exist between two generators supposedly identical.

In carrying out my invention in one form thereof I provide for maintaining substantially equal load division between series connected generators and for stabilizing their operation. More specifically, I utilize a field winding on each generator responsive to the voltage of the other generator so that when the voltages of the generators differ a proportionate change in the excitation of the generator is produced in a direction to correct for the difference in voltage.

Figure 2:
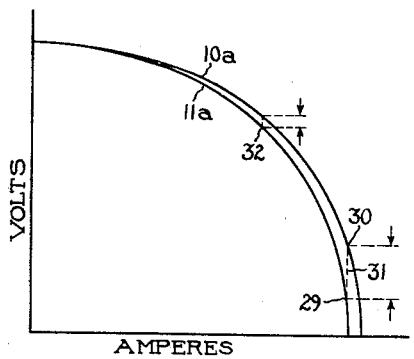

For a more complete understanding of my invention, reference should now be had to the drawing in which Fig. 1 illustrates diagrammatically a control system embodying my invention, while in Fig. 2 I have shown curves explanatory of the operation of my invention.

Referring now to the drawing, I have shown my invention in one form as applied to the generators 10 and 11 connected in series with each other and with a motor 12. A separately excited field winding 13 provides excitation for the motor. The generator 10 is provided with a compensating winding 14, a differential series winding 15, a separately excited field winding 16, and a field winding 17 connected to be energized by the voltage of the generator 11. Similarly, the generator 11 is provided with a compensating field winding 20, a differential series winding 21, a separately excited field winding 22, and a field winding 23 connected to be energized in response to the voltage of the generator 10. While it is contemplated that the generators 10 and 11 may be driven by a single prime mover I have illustrated the more usual arrangement of separate prime movers 24 and 25 which, respectively, serve to rotate the generators 10 and 11.

In the operation of my invention the resistance 26 connected in circuit with the field windings 16 and 22 is adjusted until the desired amount of power is supplied to the motor 12 for any given torque load. As I have stated, the differential series field windings 15 and 21 are provided to give their respective generators 10 and 11 drooping characteristics. By connecting field winding 17 across the armature of the generator 11 and field winding 23 across the generator 10, the advantages previously secured by a self excited field winding are retained and these field windings also serve to insure a stable and substantially equal load division between the generators.

Referring now to Fig. 2, I have shown a characteristics curve 10a for the generator 10 and curve 11a for the generator 11 on the basis that each field 17 and 23 is connected across the armature circuit of its own generator. It will be seen that the generator 10 produces slightly higher voltage than the generator 11 for a given magnitude of current. It will now be assumed that the generators are operating at points 29 and 30 in their characteristic curves. For this value of current the difference in voltage between the generators is indicated by the broken line 31 connecting the points 29 and 30. For the condition assumed, the magnetomotive force produced by the series field windings 15 and 21 neutralizes to a substantial degree the magnetomotive forces produced by the separately excited field windings 16 and 22 and the compensating field windings 14 and 20. Therefore, the excitation produced by the field windings 17 and 23 represents a substantial proportion of the total net excitation. However, by connecting the field winding 23 so as to be responsive to the voltage of generator 10 there is produced additional excitation on the generator 11 causing a corresponding increase in voltage. It is recognized that the field windings are not effective in maintaining identical voltages, inasmuch as the correction obtained depends on a difference in voltage. However, the voltage difference is corrected so that the voltages are more nearly equal than they would otherwise have been, and an inherently stable condition of operation has replaced an inherently unstable condition.

If the field winding 17 had been connected to the generator 10 and the field winding 23 connected to the generator 11, it will be seen that for the condition assumed field winding 17 would produce substantially more excitation on the generator 10 than the field winding 23 would produce on the generator 11 because of the relatively large difference in voltage. The generator 10 would then increase its proportion of the load while the generator 11 would correspondingly reduce its load.

It is therefore possible for the differential field winding on one generator to reverse the polarity of the generator E. M. F. so that the generator would act as a motor to increase the speed of its prime mover. Of course, excessive speed of operation of the prime mover is dangerous to the machine itself as well as to the workmen.

For an operating condition indicated by the reference numeral 32 it will be seen that the voltage difference between the generators is relatively small. The corrective function of the field windings 17 and 23 is correspondingly less but each field winding 17 and 23 is effective to increase the power output of its generator for the load assumed and also tends more nearly to equalize the load division.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is,—

1. In a variable voltage drive, the combination of a pair of generators in series, each having a jointly controlled separately excited field winding and a differential series field winding, and means for maintaining substantially equal load division between said generators comprising a field winding on each generator responsive to the voltage of the other generator.

2. In combination, a load circuit, a plurality of generators connected in series with each other and to said load circuit, a separately excited field winding and a differential series field winding for each of said generators, means on each generator responsive to the voltage of another generator for producing excitation in a direction to maintain the generator voltages substantially equal.

3. In a variable voltage drive, a pair of series connected generators, field windings therefor, means for maintaining substantially equal load division between said generators comprising connections for energizing a field winding of each generator in accordance with the voltage of the other generator.

4. In a variable voltage drive, the combination of a pair of generators, separately excited field windings for each of said generators, differentially series connected field windings for each of said generators, connections for connecting said generators in series to supply a common load, a field winding on each generator responsive to the voltage of the other generator for producing a corrective component of excitation in a direction to cause the load division between said generators to be stable and remain at a substantially constant value.

5. In a variable voltage drive, the combination of a pair of similar generators connected in series in a load circuit, a series differential field winding for each generator for producing a drooping volt ampere characteristic, a separately excited field winding for each generator, means for jointly controlling the energization of said separately excited field windings and means for increasing the maximum output of each generator and for stabilizing and maintaining substantially equal load division between said generators comprising a field winding on each generator, and connections for connecting said last mentioned field winding of one generator across the armature of the other generator.

BRUCE M. MILLS.